March 17, 1970     D. ZITZELBERGER     3,501,218
VIEWING SYSTEM FOR VEHICLES
Filed July 11, 1966     2 Sheets-Sheet 1
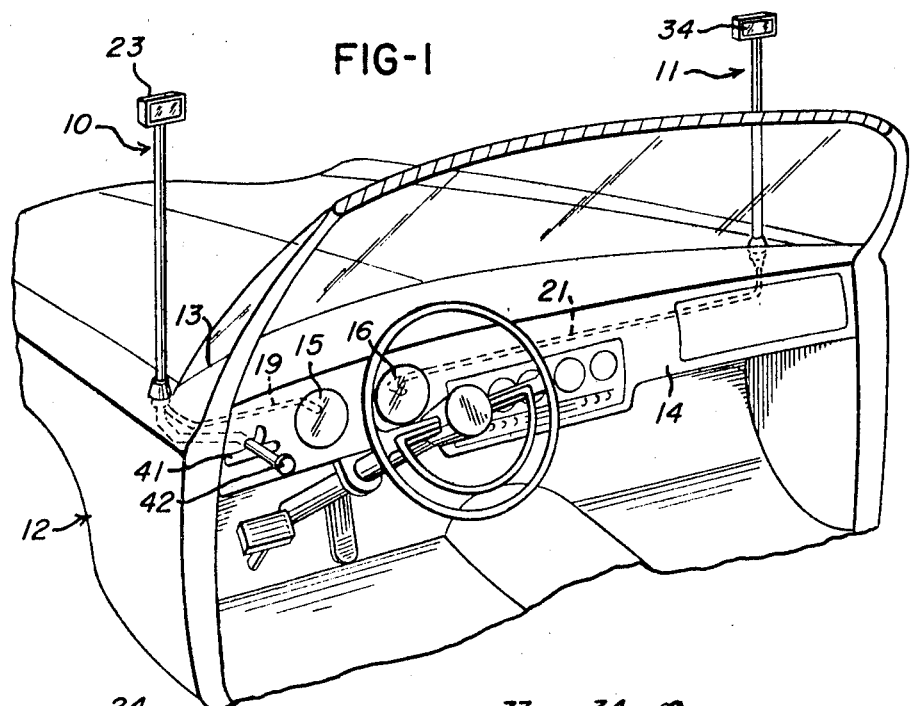
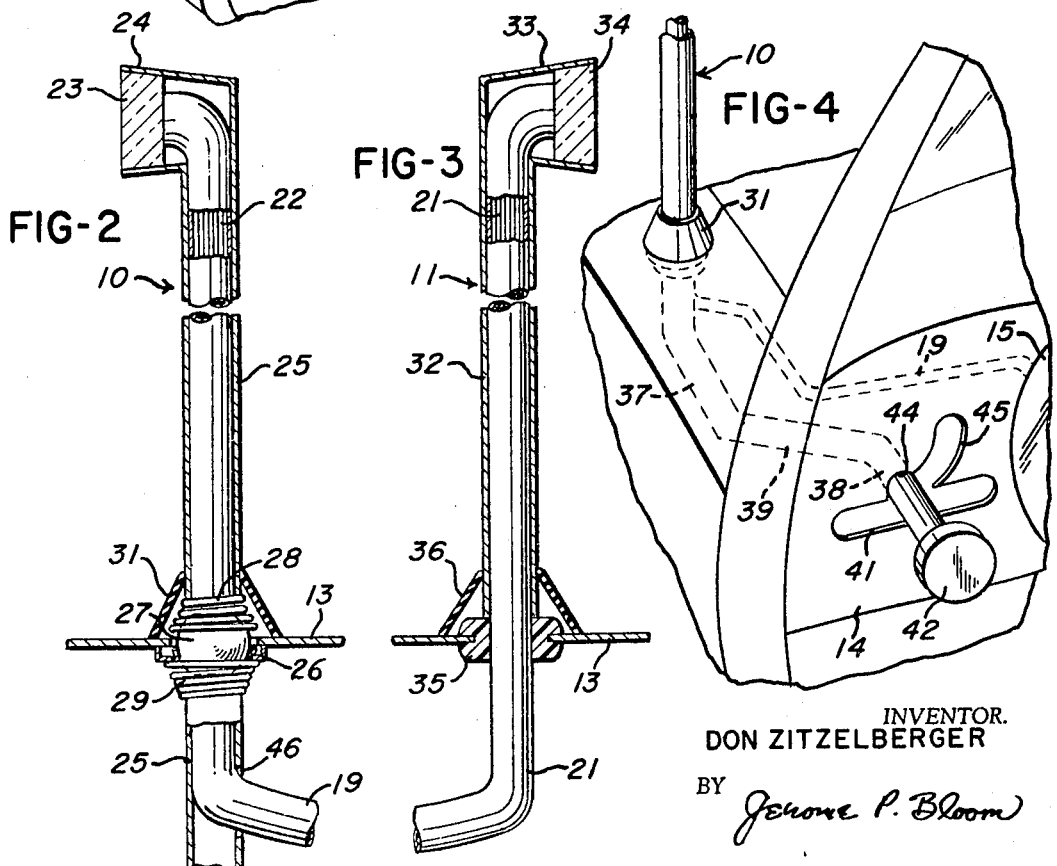
INVENTOR.
DON ZITZELBERGER
BY Jerome P. Bloom
ATTORNEY

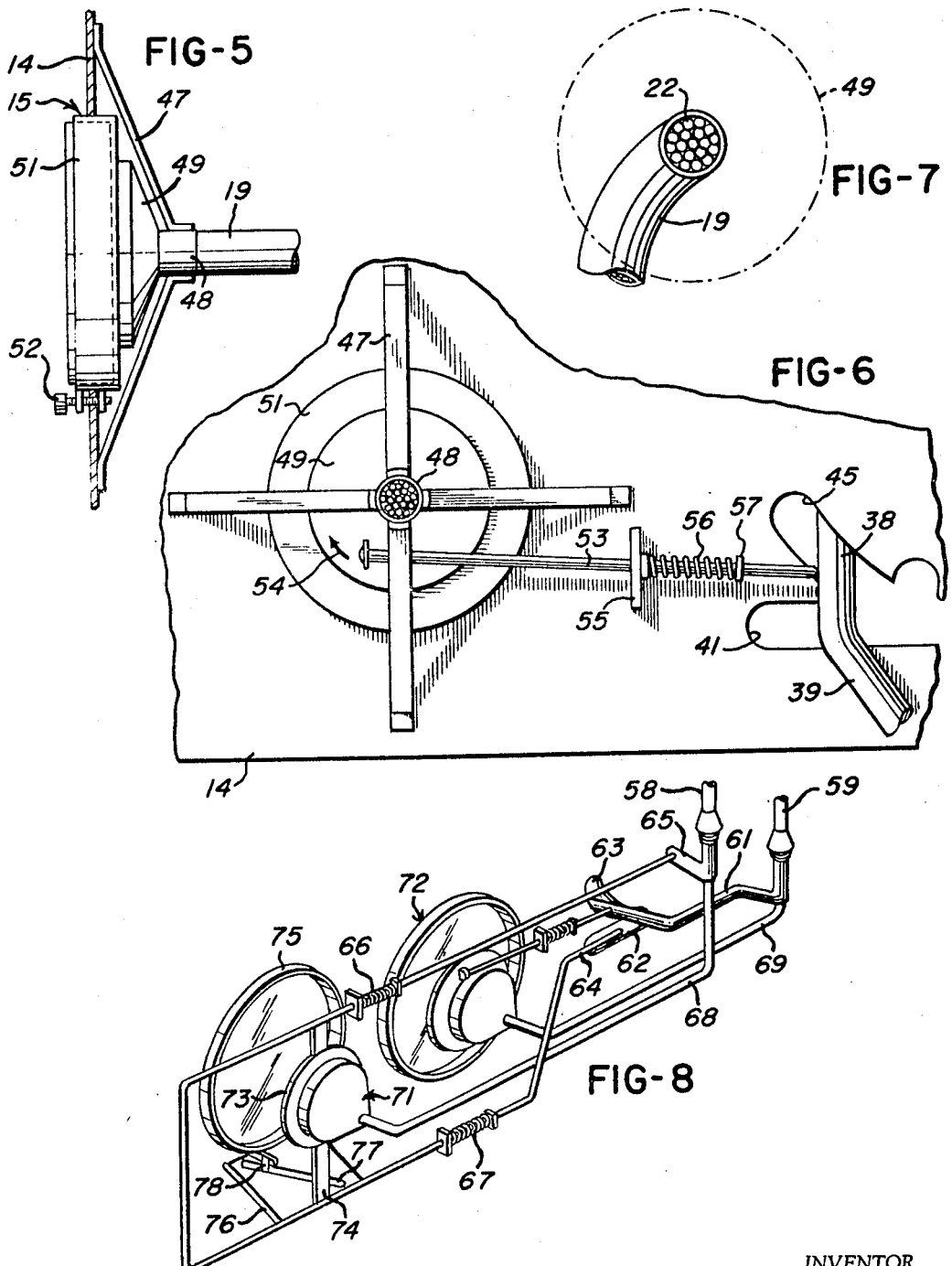

United States Patent Office 3,501,218
Patented Mar. 17, 1970

3,501,218
VIEWING SYSTEM FOR VEHICLES
Don Zitzelberger, 2137 Catalpa Drive,
Dayton, Ohio 45406
Filed July 11, 1966, Ser. No. 564,274
Int. Cl. G02b 5/16
U.S. Cl. 350—96
10 Claims

ABSTRACT OF THE DISCLOSURE

A viewing system for vehicles utilizing at least one pylon-type objective lens mounting exteriorly of the vehicle and a related viewing screen within the vehicle, with intermediate light image transmitting means. Manipulative means are accessible within the vehicle to both rotate and to effect an oblique positioning of the objective lens. Motion of the lens in the latter sense is accompanied by an automatic appropriate readjustment of the viewing screen for stable image reflection.

---

This invention relates to a unique fiber optic viewing system for automotive and other vehicles. Embodiments are so designed to overcome the limitation of prior art viewing devices and to add to a vehicle that additional element of safety enabling its driver to safely cross difficult intersections and to see around obstructions for oncoming vehicles. Further, in its preferred embodiment the invention enables a vehicle operator to have a panoramic view of a substantial area surrounding his own vehicle.

A primary object of the invention is to provide a new and improved viewing system for automotive and like vehicles which is economical to fabricate, more efficient and satisfactory in use, and adaptable to a wide variety of applications.

A further object of this invention is to provide, for use on vehicles, an improved viewing system which substantially increases the viewing capability of the vehicle operator.

Another object of the invention is to introduce in automotive and like vehicles a new principal of periscopic viewing.

A still further object of the invention is to provide in automotive and like vehicles a unique system for frontal and rearward viewing by means of exterior panoramic viewing devices which transmit an accurate picture of a viewed area to an interior screen by means of fiber optic cables, which function irrespective of the attitude of the viewing means.

An additional object of the invention is to provide a viewing system for the operator of an automotive or like vehicle enabling the operator to simultaneously sight areas to opposite sides of his vehicle.

Another object of the invention is to provide an improved viewing system for use in automotive and other vehicles possessing the advantageous structural features, the inherent meritorious characteristics, and the means and mode of use herein described.

With the above and other incidental objects in view as will more fully appear in the specification, the invention intended to be protected by Letters Patent consists of the features of construction, the parts and combinations thereof and the mode of operation as hereinafter described or illustrated in the accompanying drawings, or their equivalents.

Referring to the accompanying drawings which illustrate preferred but not necessarily the only forms of embodiment of the invention, FIG. 1 is a fragmentary, generally diagrammatic, view, in perspective, showing a viewing system applied to an automotive vehicle in accordance with the present invention;

FIG. 2 is a schematic view of a viewing pylon incorporated in the system of FIG. 1, the pylon being partly in section to show the interior structure;

FIG. 3 is a view similar to that of FIG. 2 showing a second viewing pylon;

FIG. 4 is a generally schematic view, in perspective, showing the means within the vehicle for effecting the remote positioning of the objective lens incorporated in the pylon of FIG. 2;

FIG. 5 is a schematic view, in longitudinal section, showing the details of the viewing screen as used in connection with the objective lens;

FIG. 6 is a generally schematic view showing means for rotating an interior viewing screen in correspondence with an oblique positioning of an objective lens;

FIG. 7 is a schematic view, in cross-section, of the fiber optic cable utilized in the system of FIG. 1; and FIG. 8 is a detail view, in perspective, of a modification of the system shown in FIG. 1.

Like parts are identified by similar characters of reference throughout the several views.

Referring to FIGS. 1 through 7 of the drawings, the invention embodiment is there illustrated to include a pair of parallel transversely spaced pylons 10 and 11 which frame the windshield of an automobile 12. The pylons rise vertically from the respectively opposite ends of a cowl 13.

The periscopic type pylon 10 includes a tubular frame 25 which extends downwardly through an opening in the cowl 13. Fixed to the underside of the cowl portion 13 is a mounting ring 26. The later has an aligned opening through which depends the lower end of the frame 25. Within the ring 26 and the opening in the cowl 13 an exteriorly projected structure provides a universal ball joint 27 on the frame 25 which has a floating mount in the ring 26. Anchored at one end to the upper surface of the cowl portion 13, relatively adjacent the opening for the tubular framework 25, is one end of a helical torsion spring 28. The spring 28 is wrapped around the upper portion of the ball joint 27 and eventually connects to the framework 25 thereabove. As will be further described, the winding of the spring 28 resists a rotary motion of the tubular frame 25 in one direction. A spring 29 is similarly anchored to the ring 26 at a face thereof remote from the cowl portion 13 and wraps around the lower portion of the ball point 27 to eventually anchor in a connected relation to the framework 25 therebelow. The spring 29 operates in a direction opposite to the spring 28. Accordingly, the opposed springs 28 and 29 will normally enforce a neutral position of the tubular frame 25.

Observing FIG. 2 of the drawings, a flexible sleeve 31 connects between the tube 25 and the cowl portion 13 to provide thereby a protective sheath which covers the spring 28 and the ball joint 27.

Housed within the tubular framework 25 and projecting through its ball joint 27 is a cable 19 comprised of optical fibers. The latter are fibrous-like filaments 22 (FIG. 7) drawn or otherwise formed of a glass or plastic material. As assembled, the filaments 22 form a fasciculus, each component of which is capable of transmitting light images from end to end. Such transmission is characterized by trueness and accuracy.

In the example shown in FIG. 2, at the upper end of the tubular framework 25 the cable 19 connects to the rear of a wide angle panoramic type objective lens 23. The lens 23 is contained in a housing 24 forming a lateral extension of the upper extremity of the tube 25. The housing 24 is so formed to expose the viewing surface of the lens 23.

For convenience of description the pylon 10 is positioned to the left side of the windshield and will be referred to as the forward viewing device. Correspondingly, the pylon 11, in this instance, will be described as a rearward viewing device.

Noting FIGS. 2 and 4 of the drawings, the tubular framework 25 has an opening 46 just below the cowl portion 13 through which is threaded the cable 19. The threaded end of the cable eventually connects to a viewing screen 15 at the vehicle dashboard 14.

FIG. 5 of the drawings shows, schematically, the manner in which the fasciculus 19 connects to the viewing screen 15. The screen 15 may be considered a subjective lens, the fasciculus 19 extending thereto through a collar 48 mounted to the rear of the dash 14 by means of plural braces 47. Connecting to the fasciculus 19 beyond the collar 48 is a wide angle lens 49. Positioned in front of the lens 49 is a magnifying lens 51 secured in the dashboard 14 by adjusting screws 52. The screws are so applied to enable an axial displacement of the lens 51 to and from the lens 49. Together, the lens elements 49 and 51 provide the viewing screen 15.

In this instance collar 48 constitutes a bearing for the subjective end of the fasciculus 19, which is rotatable therein for purposes to be further described.

It may be readily observed that the panoramic objective lens 23, which is rendered capable of scanning an extremely wide area and receiving an image thereof, functions to transmit this image to the connected ends of the individual fibers 22. Resultingly, each respective fiber transmits a defined image to the lens 49 for a common viewing thereof through the magnifying lens 51.

Looking more particularly to FIG. 4 of the drawings, connected integral with the tube 25 below the exit for the fasciculus is a relatively angled control lever formed of three integrated sections, 37, 38 and 39. The section 37 connects directly below the exit for the cable 19 and extends therefrom at a small angle to a horizontal. The remote section 38 extends generally parallel to the section 37 and projects through an opening in the dashboard 14. The parallel sections 37 and 38 are transversely offset by the relatively angled intermediate lever section 39. The opening in the dashboard 14 has the form of a transversely elongated horizontal slot 41. The lever portion 38 projects therethrough to terminate in a knob 42 interiorly of the vehicle and adjacent its operator. Communicating with the upper central edge portion of the slot 41 is a slot extension identified by the numeral 45. The slot portion 45 has an upward diverging relation to the portion 41, in a sense to the right of the vehicle operator. At its juncture with the portion 41 the uppermost edge of extension 45 has an arcuately recessed edge portion 44 which defines a neutral lock position for the lever section 38.

Looking once more to the pylon 10, the relatively opposed springs 28 and 29 naturally urge the pylon to assume a neutral position wherein the connected lever portion 38 is caused to orient in line with the recessed portion 44 of the dashboard slot. In this neutral position the objective lens 23 faces directly forward of the vehicle 12. On grasping the knob 42 to move the lever portion 38 down from recess 44, the operator may then selectively move the lever from one end of the slot 41 to the other whereby to rotate tube 25 about its longitudinal axis. In either direction of movement, the springs 28 or 29 are correspondingly stressed whereby on release of the knob 42 to center the tubular frame 25 and the lens 23 in a forwardly facing normal viewing position.

Due to the universal nature of the mount provided by ball joint 27, the latter in corresponding cooperation with the springs 28 and 29 permits the movement of control knob 42 to resultingly move the lever section 38 into the slot portion 45. This, through the connection of the lever to the tubular frame 25 by way of the lever section 37, will cause an oblique tilting motion of the pylon 10 and, simultaneously, an angular displacement of the objective lens 23 outwardly of the vehicle to the side thereof most adjacent the operator. The effect of this is to enable the objective lens to take a sighting around a forward obstruction and even around a corner. Upon release of the control knob 42 the springs 28 and 29 again have a function to bias the pylon in a manner to yieldingly urge that it reassume a vertical position facing forwardly of the vehicle.

Of course, the lens 49 related to the fasciculus 19 may be fixed to the collar 48 shown in FIG. 5 of the drawings. However, this is not desirable in the instance of this preferred embodiment of the invention wherein the pylon 10 is rendered capable of being variably positioned. In this instance it is important that the lens 49 may be rotated correspondingly with an angular displacement of the objective lens. By this means there is provided an optimal transmission of viewed images to the viewing screen and a presentation of the images in a normal upright position is insured. To this end, as seen in FIG. 6 of the drawings, a rod 53 is pivotally connected at one end, in a suitable manner, to the rear of the lens 49, at a point radially offset to or eccentric with respect to its center. The rod extends to have its other end dispose to the rear of the dash 14, adjacent the upwardly curved slot portion 45. Intermediate its ends a portion of the rod 53 has a sliding mount in an abutment 55 fixed to the rear of the dashboard 14. A compression spring 56 is coiled about a portion of the rod 53 to anchor at one end at the abutment 55 and at the other end to a collar 57 which is fixed to the rod adjacent and spaced from the slot portion 45. The effect of the spring 56 is to bias the rod 53 in the direction of the lever portion 38 which connects to the tubular frame 25 of the pylon 10. The normal positioning of the rod 53 induces a relatively centered position of the lens 49 corresponding to a vertically upright position of the pylon 10. It will be seen that when the knob 42 of the control for the pylon 10 is moved upwardly in the slot portion 45 to tilt the objective lens angularly outward from the side of the vehicle, the control lever portion 38 comes in contact with the rod 53. Through the interconnection of the latter with the lens 49, there is a resultant turning of the lens 49 about its axis, in a direction indicated in FIG. 6 by the numeral 54. The rotation of the lens 49 is automatic in correspondence with the outward tilting of the objective lens and in direct correspondence with the angular displacement. In this manner it is insured that the image transmitted through the fasciculus will appear on the viewing screen 15 in a proper and normal upright position. It will be obvious that when the objective lens is moved back to its normal forward facing position, the spring 56 will rotate the lens 49 back to its normal base reference position.

Looking now to the "rearward viewing" pylon 11 which is to the right of the vehicle 12, this pylon also includes an exterior tubular frame which is here identified by the numeral 32. In this case the tubular frame 32 mounts to a fixture 35 which defines an aperture in the cowl 13. A flexible protector 36 connects between the frame 32 and the cowl 13 in the manner of the element 31. Housed in and extending through the frame 32 is a fasciculus 21 which is identical to the faciculus 19 in the pylon 10. In this instance the upper end of the fasciculus 21 interconnects with the rear of a wide angle panoramic type objective lens 34. The lens 34 is contained in a housing 33 forming a lateral extension of the upper end of frame 32. The housing 33 is so formed and so positioned to expose the viewing surface of the lens 34 to face to the rear of the vehicle 12. The end of the fasciculus 21 which extends through the cowl 13 eventually connects to a viewing screen 16 at the dashboard 14. Screen 16 is identical to the viewing screen 15 and positioned immediately to its side. Accordingly, the details of the viewing screen 16 and its interconnection with the fasciculus 21 need not be further described.

It is therefore obvious that the pylon 10 may be moved in multiple senses to variously position the objective lens 23 within the limits of the vehicle and to one side, while the lens 34 is directed rearwardly of the vehicle. In this manner there is made simultaneously available to the vehicle operator a wide angle view of areas both to the front and the rear of the vehicle and to an extent not contemplatable in use of ordinary viewing devices. It should be obvious of course that the pylon 11 could also have a structure and composition similar to that of the pylon 10 with corresponding benefits.

The system heretofore described offers a maximum of safety in use thereof by the operator of the vehicle. While driving, the operator has directly before him a side by side, complete, panoramic view of areas both to the front and to the rear of the vehicle. He has ready visual access thereto at all times. Morevore, in the vent he should find difficulty in looking beyond an obstruction, the vehicle operator has also a direct access to the knob 42 related to the periscopic type pylon 10. In view of the direct connection of the knob 42 to the objective lens, the operator may positively dispose the objective lens in any position he may require under the particular circumstances occurring at any one instant. By utilizing a fasciculus to to transmit the panoramic view in accordance with the invention, the resulting images on the viewing screens have optimal integrity. The invention further provides that twist of the fasciculus at the objective end may be compensated by a corresponding twist of the related subjective lens. Thus' the latter will in all cases present an image at the viewing screen in a normal upright condition. While not specifically shown or described, it is contemplated, where necessary, that additional lens components may be employed to insure that the received image will in all cases be oriented to a normal observed position.

It is repeated that the recess 44 in the control slot of dashboard 14 provides a most simple means for achieving a locking of the pylon 10 in a normal upright position. On grasping the knob 42 and slightly depressing it, it is quickly released for movement in either the slot 41 or the slot portion 45.

Providing the benefit of the universal mount which is made an integral part of the tubular frame 25, the invention enables a panoramic viewing of areas not only directly forward of a vehicle but substantially fully to either side thereof.

The invention thus provides a complete, most versatile and an optimally safe viewing system for an automotive or other vehicle.

While the forwardly and rearwardly facing pylons 10 and 11 are disclosed as occupying positions on opposite sides of the vehicle, they may, if desired, be placed in a tandem position to one side of the vehicle. Moreover, the pylons may be so disposed as to have their objective lens normally faced in any selected position as a base of reference. By use of the invention system one could even simultaneously provide on the screens 15 and 16 a view to either side of a vehicle as well as to the front or to the rear.

A modified form of the periscopic viewing system of the invention is shown in FIG. 8 of the drawings. The system here disclosed provides that the forwardly and rearwardly facing pylons be placed in a tandem relation at the left side of a vehicle adjacent its operator. Structure is provided, operable from a single control to adjust the pylons simultaneously as suggested above.

Only so much structure is shown (schematically) as appears necessary for an understanding. As shown, a pair of pylons 58 and 59 mount in a tandem relation, the former facing rearwardly of the vehicle and the latter facing forwardly thereof. The lower part of the pylon 59 terminates in a control lever, schematically shown and identified by a numeral 61, which extends to a dash including a horizontally oriented slot 62 having to one end an interconnected divergent portion 63 which is reversely directed in a sense to overly the portion 62. Exiting from the lower end of pylon 59 is the lower end of a contained fasciculus 69 of the nature previously described. The fasciculus connects to a subjective lens unit 72 providing a viewing screen at the dash.

It is noted in FIG. 8 that the control portion of the lever 61 which extends through the slot in the dashboard positions normally to the one end of the slot 62 adjacent the arcuate divergent portion 63. When the lever 61 is moved toward the other end of the slot by the vehicle operator, it will in this case rotate the pylon 59 to face to the left, in a sense outwardly of the vehicle. In the course of this travel the lever 61 engages a projected extremity of a rod 64. The rod 64 has a generally U-shaped configuration and its ultimate extremity connects to a control lever 65 fixed to the bottom of the pylon 58. Thus, at the same time the pylon 59 is turned to the left the rod 64 is laterally displaced. Bodily shifting movement of the rod 64 produces a pulling impulse on lever 65 which in this instance produces a rotary adjustment of the pylon 58. Resultingly, the objective lens on pylon 58 may be caused to turn from a position sighting to the rear of the vehicle to one sighting to the right hand side of the vehicle.

Compression springs 66 and 67 are appropriately installed on opposite leg portions of the U-shaped rod 64 and appropriately connected to the rear of the dashboard of the vehicle. These springs function to return the rod 64 to its normal position illustrated in FIG. 8 when the control lever 61 is returned to its normal position as shown.

The pylon 58 contains a fasciculus 68 which interconnects its related objective lens (not shown) to a subjective lens means 71. The objective lens (not shown) in connection with the pylon 59, as previously mentioned, is connected through the related fasciculus 69 to the subjective lens 72. The lens means 71 and 72 provide side by side viewing screens comparable to the means 15 and 16 in the invention embodiment illustrated in FIG. 1 of the drawings.

In this case the lens means 71 is primarily adapted for relatively short range viewing immediately to the rear of the vehicle. When the related objective lens is turned to the right side of the vehicle, at which point a longer range viewing is desired, it may be necessary to modify the capacity of the lens means 71 in corespondence therewith. To this end, there is in connection with the rod 64 a support 74 for a lens means 73. The lens element 73 shifts bodily with the rod 64 to move to and from the subjective lens 71 to achieve thereby a predetermined spacing as required by the position of the related objective lens. Spaced outwardly from the lens 73 is a magnifyings lens 75 having interconnected therewith an antifriction guide member 78 which depends therefrom into an angled slot 77 in a plate 76. The plate 76 is positioned below the magnifying lens 75 and connected to move with the rod 64. It may be readily seen that as the rod 64 moves to the left or right, it produces a corresponding shift of the magnifying lens as guided in correspondence with the angularity of the slot 77.

By this automatic positioning of the lens elements 73 and 74, one achieves at all times the proper focus for observing a projected image on the subjective lens 71, as directed from its related objective lens in the pylon 58.

Additional means serving as a guide for the upper portion of the lens 75 may be suitably provided in connection with the dashboard of the vehicle. The details of such means are not related in view of the fact they may be of any conventional nature.

It is to be understood of course that the disclosure in FIG. 8 of the drawings is limited to only that which is necessary for an understanding of the modification which is embodied therein. Details not shown correspond to those revealed in the first described embodiment.

Thus, the invention as schematically and diagrammatically illustrated provides for means affording increased safety in the operation of automotive and other vehicles.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect.

Having thus described my invention, I claim:

1. A viewing system for vehicles including an objective lens unit and a viewing screen unit, means including an element of tubular form capable of mounting the objective lens unit in a vertically elevated position on the outside of the vehicle, means mounting said screen unit for viewing from inside the vehicle, optical fiber image transmitting means extending between and inter-connecting said objective lens and screen units and encased at least in part by said element of tubular form and means in connection with said objective lens unit operable for a selective rotation thereof about its axis and for substantially universal movement of said objective lens unit from a reference position within the vehicle limits to a laterally displaced position.

2. A viewing system as in claim 1 characterized by means interrelating said screen unit and said objective lens unit to produce an adjustment of the viewing position of said screen unit in a direct correspondence with an angular displacement of said objective lens unit.

3. A viewing system as in claim 1 characterized by a second pair of objective lens and screen units, means mounting the objective lens unit of said second pair to parallel the first mentioned objective lens unit in their normally disposed positions, the screen unit of said second pair being positioned for substantially side by side viewing with the screen unit of the first pair, said objective lens units being arranged to observe distinctly remote portions of the vehicle surroundings and to simultaneously transmit a panoramic view thereof through said viewing screen units.

4. A viewing system as in claim 1 wherein said means mounting the objective lens unit is a tubular frame the remote end of which has connected thereto a control lever which disposes adjacent the operator of the vehicle and means are operatively related to said control lever to provide for limited movement thereof in opposite senses in a given plane and for an additional limited movement thereof in a sense divergent from said plane to define thereby the means for selective rotation and angular displacement of the objective lens unit from a reference positions.

5. A viewing system as in claim 1 characterized by said element of tubular form being a relatively rigid sleeve connected to said objective lens unit, said sleeve having means in connection therewith providing for a substantially universal mount thereof to enable the selective rotation and angular displacement of said objective lens unit, said sleeve further having means in connection therewith operative to normally oppose a displacement of said sleeve from a predetermined reference position.

6. A viewing system according to claim 1 characterized by a pair of objective lens units, the one being arranged to normally sight forwardly of the vehicle and the other rearwardly, there being a viewing screen unit and interconnecting image transmitting means for each of said objective lens units, and including means for turning one of said objective lens units to sight to one extreme portion of the vehicle and means responsive thereto to correspondingly turn the other objective lens unit to sight from said vehicle in a distinctly different direction.

7. A viewing system as in claim 6 characterized by means mounting in an operative relation to at least one of said viewing screen units for varying its range and focus in direct response to a movement of the related objective lens unit.

8. A viewing system as in claim 1 including pairs of objective lens units and viewing screen units and characterized by the pair of objective lens units having means interrelating them for conjoint adjustment, one in response to the other.

9. A viewing system for vehicles including an objective lens unit and a viewing screen unit, means capable of mounting the objective lens unit in a vertically elevated position on the outside of the vehicle, means mounting said screen unit for viewing from inside the vehicle, optical image transmitting means extending between and inter-connecting said objective lens and screen units and means in connection with said objective lens unit operable for a selective rotation thereof about its axis and for movement of said objective lens unit from a reference position within the vehicle limits to a laterally displaced position characterized in that said last named means includes a manipulative controller accessible to the hand of an operator within the vehicle, and a guide for said controller defining a first portion, which upon receiving said controller defines a relatively stationary reference position for said objective lens unit, and a second portion, which upon receiving said controller allows to and fro motion thereof to oscillate said objective lens in a rotary sense, and a third portion into which said controller is movable to effect a lateral displacement of said objective lens.

10. A viewing system according to claim 9, characterized by an operable connection between said handle and said viewing screen operable by said controller in moving into said third portion of said guide to rotate said viewing screen in correspondence with the lateral displacement of said objective lens.

References Cited

UNITED STATES PATENTS

| 1,478,650 | 12/1923 | Hallengren | 350—52 X |
|---|---|---|---|
| 2,975,785 | 3/1961 | Sheldon | 350—96 X |
| 3,020,806 | 2/1962 | Castrucci | 350— 96 X |
| 3,136,208 | 6/1964 | Magson. | |
| 3,207,034 | 9/1965 | Harter | 350—52 |
| 3,380,335 | 4/1968 | Clave et al. | 350—52 X |

JOHN K. CORBIN, Primary Examiner

U.S. Cl. X.R.

350—31, 52